United States Patent [19]
Jaeger et al.

[11] Patent Number: 5,764,424
[45] Date of Patent: Jun. 9, 1998

[54] PRECISION EXTENDER LENS FOR STEREO VISION SYSTEMS

[75] Inventors: Randy L. Jaeger, Huntington Beach, Calif.; Lee S. Horst, Snowflake, Ariz.; David L. Harrington, Fairfield, Calif.

[73] Assignee: McDonnell Douglas Corporation, Huntington Beach, Calif.

[21] Appl. No.: 720,718

[22] Filed: Oct. 2, 1996

[51] Int. Cl.⁶ .................................................. G02B 15/14
[52] U.S. Cl. .................................. 359/702; 359/819
[58] Field of Search .......................... 359/819, 828, 359/646, 702

[56] References Cited

U.S. PATENT DOCUMENTS

| | | |
|---|---|---|
| 1,169,731 | 1/1916 | Mengel . |
| 1,498,177 | 6/1924 | Leonard . |
| 2,184,018 | 12/1939 | Ort . |
| 2,268,338 | 12/1941 | Köber et al. . |
| 3,157,883 | 11/1964 | Easter . |
| 3,264,934 | 8/1966 | Matagne . |
| 3,351,412 | 11/1967 | Solisch et al. . |
| 3,608,458 | 9/1971 | Ratliff, Jr. . |
| 4,110,005 | 8/1978 | Bohm et al. . |
| 4,418,993 | 12/1983 | Lipton . |
| 4,436,369 | 3/1984 | Bukowski . |
| 4,466,709 | 8/1984 | Osawa .................................. 359/702 |
| 4,725,863 | 2/1988 | Dumbreck et al. . |
| 4,749,264 | 6/1988 | Taniguchi et al. . |
| 4,934,789 | 6/1990 | Lemke .................................. 359/828 |
| 5,218,475 | 6/1993 | Tsuchida . |

*Primary Examiner*—Georgia Y. Epps
*Assistant Examiner*—Thomas Robbins
*Attorney, Agent, or Firm*—Harness Dickey & Pierce P.L.C.

[57] ABSTRACT

An attachment lens system (10) to adjust magnification has a housing (20) with an optical system (22). The housing (20) has a mechanism (36) to secure it to a stereo visual system (12) and to position the housing (20) in front of the stereo visual optical system. The optical system (22) is an afocal system including at least two lenses (90, 92) which are adjustable to adjust focal length of the entire system. Also the housing (20) includes a mechanism (24) to lock the lenses (90, 92) in position once they have been adjusted.

25 Claims, 1 Drawing Sheet

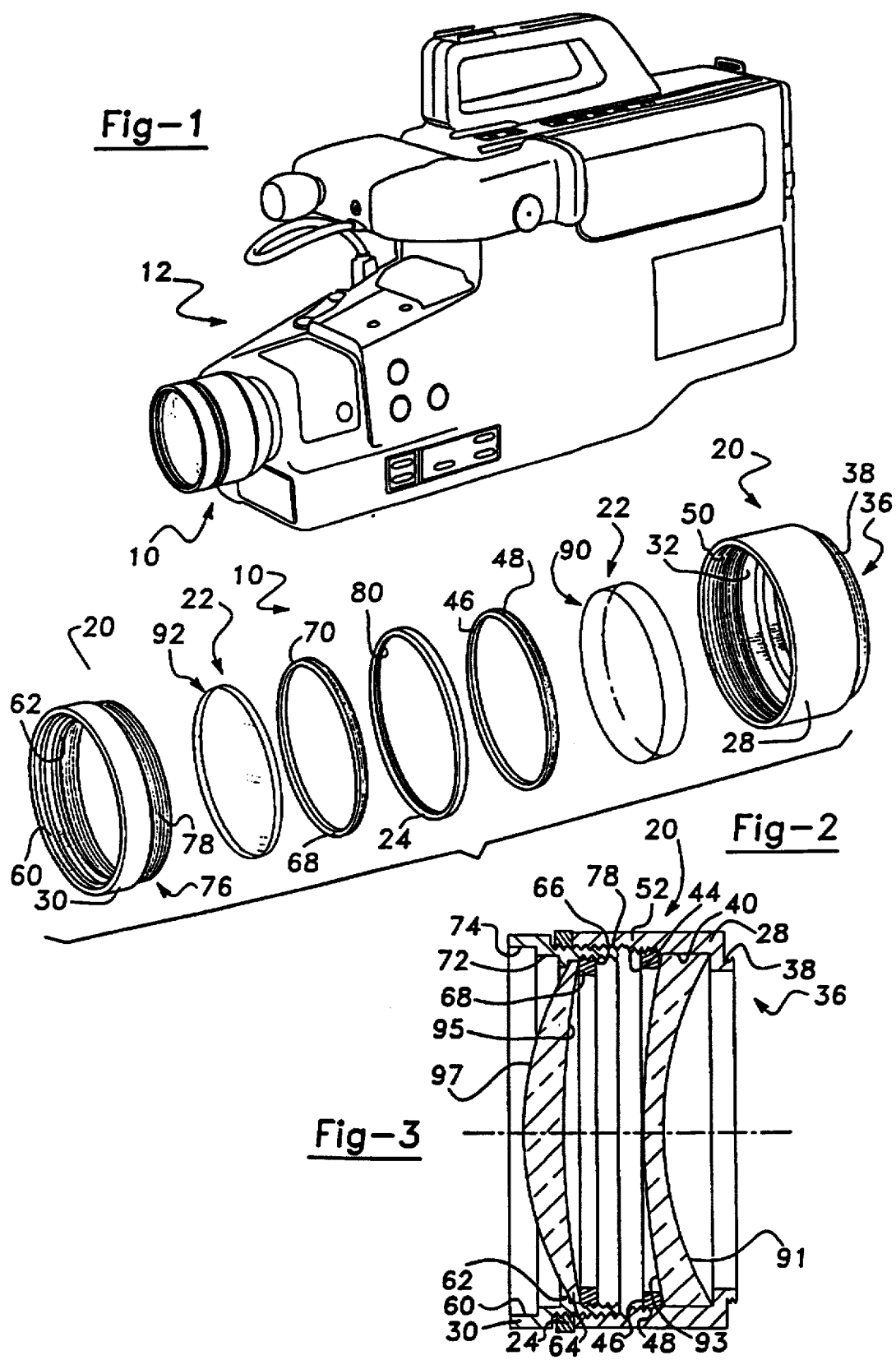

PRECISION EXTENDER LENS FOR STEREO VISION SYSTEMS

BACKGROUND OF THE INVENTION

1. Technical Field

This invention relates to extender lenses for stereo vision systems and, more particularly, to extender lenses which are positioned in front of commercial off-the-shelf lenses to accurately provide desired magnification.

2. Discussion

Commercial off-the-shelf camera lenses used in stereo vision applications have a magnification power which is determined by its optical elements. The specified magnification power ordinarily varies anywhere from two to ten percent of the stated magnification power. In applications where precise magnification is needed, the commercial off-the-shelf camera lenses may fail for that particular application.

In such applications, stereopsis (the perception of depth) is lost if the magnification of the right and left channels differs by more than one percent. While it is possible to design and manufacture lenses which maintain a magnification accuracy of better than one percent, the engineering and production of such lenses is expensive and it is not cost effective to manufacture a small to moderate quantity of lenses to the required degree of precision. Commonly used focal length extenders are usually placed between the existing lens and the image. The physical location of such an extender makes it difficult to implement a means to adjust the elements of the extender to provide an exact magnification for the system. Since the entrance pupil diameter of the system remains unchanged by the placement of an extender behind the existing lens, the aperture ratio of the modified system changes in direct proportion to the change in magnification. This is a serious detriment in low light level systems. The present invention provides an optical system which overcomes the above shortcomings. Its placement at the front of the existing lens facilitates the adjustment of the elements to obtain a precise value of magnification for the system. Since it alters the diameter of the entrance pupil in near direct proportion to the change in effective focal length, the aperture ratio of the lens system remains virtually unchanged.

SUMMARY OF THE INVENTION

According to the teachings of the present invention, a system is provided which corrects the magnification of the stereo visual system. The present invention provides an optical system which utilizes refractive elements. The system can be precisely matched with respect to the stereo vision system's field of view. Also, the field of view can be modified to a non-standard field of view which may be needed for a particular application. Further, precise field of view and field of view matching may be obtained at lower cost than custom precision lens design for a particular application.

In a preferred embodiment, the precision extender lens includes a housing with two cylindrical members. Each cylindrical member includes a bore with an annular portion to receive a lens. One of the cylindrical members includes a mechanism which secures it to a stereo vision system in front of the stereo vision system so that it is between the existing lens and the viewed object. An afocal optical system, which includes two lenses, is positioned, one each, in the cylindrical members. Also, a mechanism to move the cylinders with respect to one another is coupled with the cylinders. The mechanism enables the cylinders to move with respect to one another to adjust the position of the lens with respect to one another to adjust the magnification of the optical system. Also, a locking member is coupled with the cylinders to lock the cylinders with respect to one another after adjustment of the cylinders.

From the subsequent description and the appended claims, taken in conjunction with the accompanying drawings, other objects and advantages of the present invention will become apparent to those skilled in the art.

BRIEF DESCRIPTION OF THE DRAWINGS

In the accompanying drawings, FIG. 1 is a perspective view of an extender lens in accordance with the present invention coupled with a stereo vision system.

FIG. 2 is an exploded view of the extender of FIG. 1.

FIG. 3 is a cross-section view through the extender of FIG. 2.

DETAILED DESCRIPTION OF THE PREFERRED EMBODIMENT

Referring to FIG. 1, an attachment lens system for adjusting magnification is illustrated and designated with the reference numeral 10. The attachment lens 10 is secured to a stereo vision system, such as a video camera 12. The attachment lens 10 is secured to the video camera in front of the optical elements of the video camera 12 or between the object viewed and the optical elements of the video camera 12.

The attachment lens includes a housing 20, an optical system 22 and a lock ring 24. The housing 20 includes first and second cylindrical members 28 and 30. The first cylindrical member 28 includes a central bore 32 which is stepped to form a plurality of stepped annular portions in the cylinder. Also, the first cylindrical member includes an extending annular flange 36 which includes an external thread 38 to secure the cylindrical member 28, as well as the housing, to the front of the video camera 12. The central bore annular portion 40 is adapted to receive a lens. The annular portion 42 includes an internal thread 44 which is adapted to receive a retaining ring 46. The retaining ring 46, which includes an external thread 48, retains the lens within the first cylindrical member. The annular stepped portion 50 includes an internal thread 52 and is adapted to receive the second cylindrical member 30 to enable the cylindrical members 28, 30 to move with respect to one another.

The second cylindrical member 30 includes a central bore 60 which includes stepped annular portions. An annular flange 62 extends into the bore 60 which acts as a stop for the lens. The annular portion 64 receives a lens from the optical system 22. The bore also includes an internally threaded portion 66 which receives a retaining ring 68, with external threads 70, to secure the lens within the second cylindrical member 30. The cylindrical member includes stepped annular portions 72 and 74 in front of the stop 62 to enable passage of light within the lens. The external annular surface 76 of the second cylindrical portion includes threads 78 which mesh with threads 70 of the first cylindrical member 28 to enable adjustment of the position of the lenses with respect to one another. The threaded first and second cylindrical members 28, 30 are rotated so that the lenses can move with respect to one another to adjust the focal length of the stereo vision system as well as the attachment.

The lock ring 24 is also positioned onto the threads 78. Once the cylinders 28 and 30 have been adjusted to a desired position, the lock ring 24, with its internal threads 80, is secured against the first cylindrical member on the second cylindrical member 30 to lock the cylindrical members 28, 30 with respect to one another which, in turn, fixes the position of the lenses with respect to one another. Thus, precise adjustments are obtained by the desired positioning of the lenses with respect to one another. The lenses are then locked in position to achieve the desired precise magnification of the system.

The optical system 22 is an afocal Galilean system and includes two lenses 90 and 92. The lenses 90 and 92, as mentioned above, are positioned in the first and second cylindrical members 28, 30. Both lenses 90 and 92 are meniscus lenses with the lens 90 being positioned in the first cylindrical member 28 and being a negative powered lens. The lens 92 is positioned in the second cylindrical member 30 and is a positive powered lens. Both lenses have spherical surfaces 91, 93 and 95, 97. The lenses 90 and 92 are adjusted with respect to one another so that distance or gap ($d_{95}$) between the concave surface 95 of the lens 92 with respect to the convex surface 93 of the lens 90 can be varied. This adjustment distance provides desired distance to adjust the lenses with respect to one another to precisely adjust the magnification of the stereo vision system. A prescription for the lenses 90 and 92 is listed below.

TABLE I

| Radii | Thickness and Separations | $n_d$ | $v_d$ |
|---|---|---|---|
| $r_{97} = 45.52$ | | | |
| | $d_{97} = 7.00$ | 1.517 | 64.2 |
| $r_{95} = 90$ | | | |
| | $d_{95} = 10.413*$ | AIR | |
| $r_{93} = 90$ | | | |
| | $d_{93} = 3.00$ | 1.517 | 64.2 |
| $r_{91} = 41.42$ | | | |

*$d_{95}$ is adjustable from 8.25 to 12.53

The attachment lens 10 is secured to the video camera by screwing the threads of the first cylindrical member onto the camera. This alters or expands the diameter of the entrance pupil in near proportion to the increase in effective focal length so that the F-number of the existing lens is little changed by the addition of the extender lens. Ordinarily, while the video camera may be visually acceptable, the equipment is not adjusted for critical applications, such as in-flight refueling, which requires a higher degree of precision. Ordinarily, for adjusting the magnification of the system, a test pattern which includes two vertical lines is viewed by the camera. The cylindrical members are rotated with respect to one another until the precise magnification is accomplished during focusing on the test pattern. After the adjustment of the first cylindrical member 28 with respect to the second cylindrical member 30 is accomplished, the locking ring 24 is rotated to fix the cylinders 28 and 30 with respect to one another. After this has been accomplished, the entire optical system is precisely adjusted to the effective focal length of the stereo vision lens system. Thus, the system maintains stereopsis or depth perception between left and right channels of the stereo vision system.

Thus, by providing an inexpensive lens attachment, commercially off-the-shelf available cameras may be utilized for critical applications which require a higher degree of precision. Some of the uses with this equipment can then be utilized for in-flight refueling of aircraft via remote operator stations, remote cargo handling for aircraft or other transportation vehicles, remote vehicle pilotage for planetary exploration as well as hazardous environmental robots and autonomous vehicles. Thus, by adding the lens extender, the focal length of the lens system is able to be precisely fine-tuned without the expense which is associated with a precision custom lens.

While it will be apparent that the preferred embodiment is both calculated to fulfill the above stated objects, it will also be appreciated that the present invention is susceptible to modification, variation, alternation and change without varying from the proper scope and fair meaning of the subjoined claims.

What is claimed is:

1. An attachment lens system for adjusting magnification comprising:
    a housing including a means for securing said housing to an optical system and positioning said housing in front of the optical system;
    an afocal optical system in the housing, said afocal optical system including at least two lenses being adjustable to adjust the focal length of the optical system;
    mechanism of said housing for adjusting said at least two lenses with respect to one another said mechanism including a pair of cylinders each having a threaded portion for positioning said cylinders with respect to one another; and
    a threaded annular locking mechanism threadably coupled with at least one of said cylinders of said housing for locking said at least two lenses in place after adjustment for the particular optical system.

2. The attachment lens system according to claim 1, wherein a first lens of said lenses has a vertex thickness approximately 2.3 times greater than a second lens and said first and second lenses are separated by a distance that is approximately 1.2 to 1.8 times the thickness of said first lens.

3. The attachment lens system according to claim 1, wherein a first lens of said lenses has a first surface and a second surface and said first surface of said first lens has a radius of curvature approximately one half the radius of curvature of said second surface of said first lens, and a second lens of said lenses has a first surface and a second surface and said first surface of said second lens has a radius of curvature of approximately 2.2 times the radius of curvature of said second surface of said second lens.

4. The attachment lens system according to claim 1, wherein said lenses are separated by a distance that is approximately 1.2 to 1.8 times the vertex thickness of one of said lenses; and approximately 2.8 to about 4.2 times the vertex thickness of said other lens.

5. The attachment lens system according to claim 1, wherein at least one of said lenses has a refractive index (n) of approximately 1.517.

6. The attachment lens system according to claim 1, wherein at least two of said lenses have a refractive index (n) of approximately 1.517.

7. The attachment lens system according to claim 1, wherein each lens of said lenses has a similar refractive index to the other.

8. The attachment lens system according to claim 1, wherein at least one of said lenses has an Abbe number (v) of approximately 64.2.

9. The attachment lens system according to claim 1, wherein at least two of said lenses have an Abbe number (v) of approximately 64.2.

10. The attachment lens system according to claim 1, wherein each of said lenses has a similar Abbe number (v).

11. An attachment lens system for adjusting magnification comprising:

a housing including two cylindrical members, each cylindrical member including a bore with an annular portion for receiving a lens, one of said cylindrical members including a mechanism for securing to an optical system in front of the optical system;

an afocal optical system including two lenses, each lens received in one of said cylindrical members;

means for moving said cylinders with respect to one another, said means coupled with said cylinders and adjusting position of said lenses with respect to one another to adjust magnification of the optical system; and a threaded annular locking ring member for locking said cylinders with respect to one another after adjustment of said cylinder members.

12. The attachment lens system according to claim 11, wherein retaining rings secure each said lens in said cylindrical members.

13. The attachment lens system according to claim 11, wherein said means for moving includes mating threads on said cylindrical members for adjusting the focal length of the system.

14. The attachment lens system according to claim 6, wherein one of said lenses has a positive power.

15. The attachment lens system according to claim 14, wherein one of said lenses has a negative power.

16. The attachment lens system according to claim 11, wherein both said lenses are concave/convex lenses.

17. The attachment lens system according to claim 16, wherein the distance or gap between said lenses can be adjusted.

18. The attachment lens system according to claim 17, wherein said lenses are (prescription) spherical.

19. A lens system for attachment to a stereo vision system, said lens system comprising:

a two piece housing including a first and second cylinder, each cylinder including a stepped bore, said first cylinder having one stepped portion in said bore for receiving a lens, a portion for coupling with the second cylinder and a portion for securing with a stereo vision system such that the housing is positioned in front of the stereo vision system;

said second cylinder bore included a stepped portion in said bore for receiving a lens and a portion for coupling with said first cylinder;

two lenses, one received in each cylinder, said lenses providing an afocal Galilean optical system, said coupling mechanism on said cylinders enabling said cylinders to move with respect to one another which, in turn, adjusts the position of the lenses with respect to one another adjusting the focal length of the stereo vision system; and an annular ring lock mechanism having threads for engaging a threaded surface of said second cylinder and disposed generally adjacent an end of said first cylinder for locking the position of said cylinders with respect to one another.

20. The attachment lens system according to claim 19, wherein said adjusting mechanism includes threads on said cylinders enabling movement, via the threads, with respect to one another.

21. The attachment lens system according to claim 20, wherein said locking ring and cylinders include threads for positioning said cylinders with respect to one another.

22. The attachment lens system according to claim 19, wherein both said lenses are concave/convex lenses and one lens is positive and the other negative.

23. The attachment lens system according to claim 19, wherein said two lenses increase the magnification of the stereo vision system to adjust the magnification of the stereo vision system to a desired precise magnification.

24. An attachment lens system for adjusting magnification consisting essentially of:

a housing including a means for securing said housing to an optical system and positioning said housing in front of the optical system;

an afocal optical system in the housing, said afocal optical system including at least two lenses being adjustable to adjust the focal length of the optical system;

mechanism of said housing for adjusting said at least two lenses with respect to one another said mechanism including a pair of cylinders each having a threaded portion for positioning said cylinders with respect to one another; and a threaded annular locking mechanism threadably coupled with at least one of said cylinders of said housing for locking said at least two lenses in place after adjustment for the particular optical system.

25. An attachment lens system for adjusting magnification comprising:

a housing including a means for securing said housing to an optical system and positioning said housing in front of the optical system;

an afocal optical system in the housing, said afocal optical system including a first lens and a second lens, said lenses being adjustable to adjust the focal length of the optical system;

said first lens having a refractive index and an Abbe number (v) similar to that of said second lens;

said first lens being separated from said second lens by a distance approximately 1.2 to 1.8 times the vertex thickness of said first lens and approximately 2.8 to about 4.2 times the vertex thickness of said second lens; one of said lenses being positive power and the other of said lenses being of negative power;

mechanism of said housing for adjusting said at least two lenses with respect to one another said mechanism including a pair of cylinders each having a threaded portion for positioning said cylinders with respect to one another; and an annular locking mechanism threadably coupled with at least one of said cylinders of said housing for locking said at least two lenses in place after adjustment for the particular optical system.

* * * * *